United States Patent
Holland et al.

(10) Patent No.: US 10,114,172 B2
(45) Date of Patent: Oct. 30, 2018

(54) MULTIMODE BEAM COMBINER

(71) Applicant: OFS Fitel, LLC, Norcross, GA (US)

(72) Inventors: William R Holland, Upper Black Eddy, PA (US); Cassandra Thalman, Somerset, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/474,073

(22) Filed: Mar. 30, 2017

(65) Prior Publication Data

US 2017/0363810 A1 Dec. 21, 2017

Related U.S. Application Data

(60) Provisional application No. 62/352,209, filed on Jun. 20, 2016.

(51) Int. Cl.
*G02B 6/26* (2006.01)
*G02B 6/028* (2006.01)
*G02B 6/02* (2006.01)
*G02B 6/38* (2006.01)

(52) U.S. Cl.
CPC ........... *G02B 6/26* (2013.01); *G02B 6/02004* (2013.01); *G02B 6/0288* (2013.01); *G02B 6/3825* (2013.01)

(58) Field of Classification Search
CPC ....................................................... G02B 6/26
See application file for complete search history.

(56) References Cited

U.S. PATENT DOCUMENTS

| | | | | |
|---|---|---|---|---|
| 5,933,561 A | * | 8/1999 | Sugizaki | G02B 6/29377 385/123 |
| 5,949,931 A | * | 9/1999 | Kitamura | G02B 6/12019 385/129 |
| 6,644,870 B2 | * | 11/2003 | Iwata | G02B 6/2551 385/28 |
| 7,016,573 B2 | * | 3/2006 | Dong | G02B 6/2551 385/46 |
| 7,532,792 B2 | * | 5/2009 | Skovgaard | G02B 6/02376 385/24 |
| 9,494,738 B1 | * | 11/2016 | Farmer | G02B 6/2835 |
| 2005/0265653 A1 | * | 12/2005 | Cai | G02B 6/2552 385/28 |
| 2009/0060417 A1 | * | 3/2009 | Bilodeau | G02B 6/14 385/43 |
| 2009/0202204 A1 | * | 8/2009 | Nielsen | G02B 6/2551 385/43 |

* cited by examiner

*Primary Examiner* — Sung Pak
(74) *Attorney, Agent, or Firm* — Sam S. Han, Esq.

(57) ABSTRACT

An up-taper is applied by a mode adapter to increase a signal mode area prior to tapering and combining.

13 Claims, 5 Drawing Sheets

MULTIMODE BEAM COMBINER

CROSS REFERENCE TO RELATED APPLICATIONS

This application claims the benefit of U.S. provisional patent application Ser. No. 62/352,209, filed 2016 Jun. 20, having the title "Multimode Beam Combiner," by Holland, et al., which is incorporated herein by reference in its entirety.

BACKGROUND

Field of the Disclosure

The present disclosure relates generally to optics and, more particularly, to beam combiners.

Description of Related Art

Conventional tapered fiber combiners, such as pump combiners or beam combiners, are manufactured by stacking fibers and then tapering the stack. This results in a decrease in cross-sectional area along the taper. Correspondingly, the principle of operation for beam combiners dictates that 'the waveguides' mode areas will decrease along the taper as the cross-sectional area decreases.

SUMMARY

The present disclosure teaches a mode expander that is applied as a mode adapter to increase a signal mode area (relative to the cladding area) prior to tapering and combining multiple waveguides. Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Efforts are taken to minimize degradation of beam quality or maximize brightness when combining multiple optical beams into a single output fiber. One figure-of-merit that represents a measure of beam quality is a Beam Parameter Product (BPP), which is defined as a product of beam divergence and a beam radius. A smaller BPP (e.g., BPP<4) represents higher quality, while a larger BPP represents lower quality. Even as optical systems migrate toward higher powers (in excess of twelve (12) kilowatts (kW)), the demand for high quality (e.g., BPP<4) remains uncompromised.

Figure 1A:
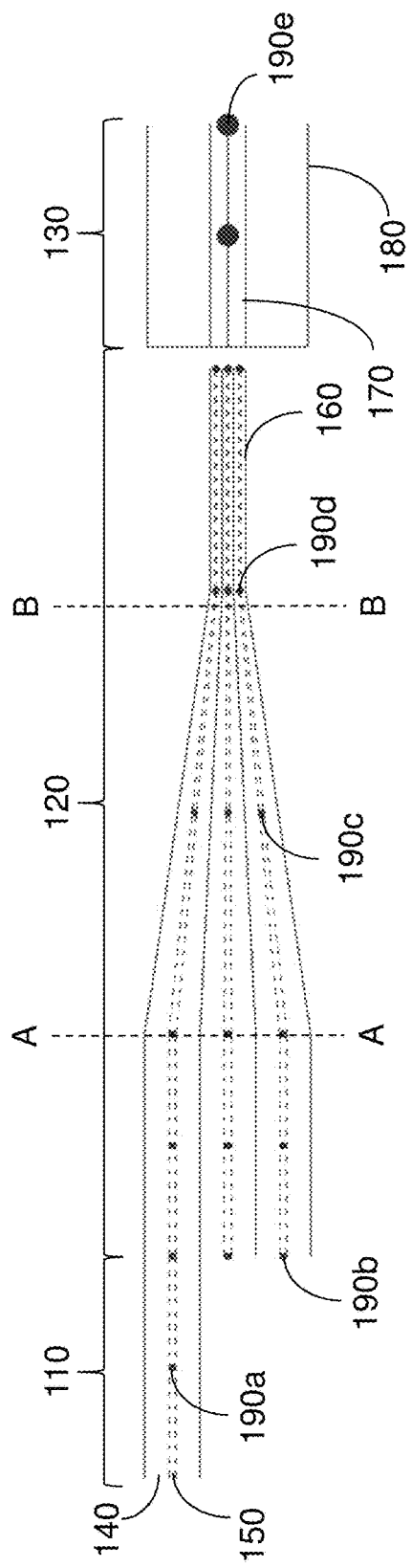
FIGS. 1A and 1B (collectively, FIG. 1) are diagrams showing a conventional beam combiner.
Figure 1B:
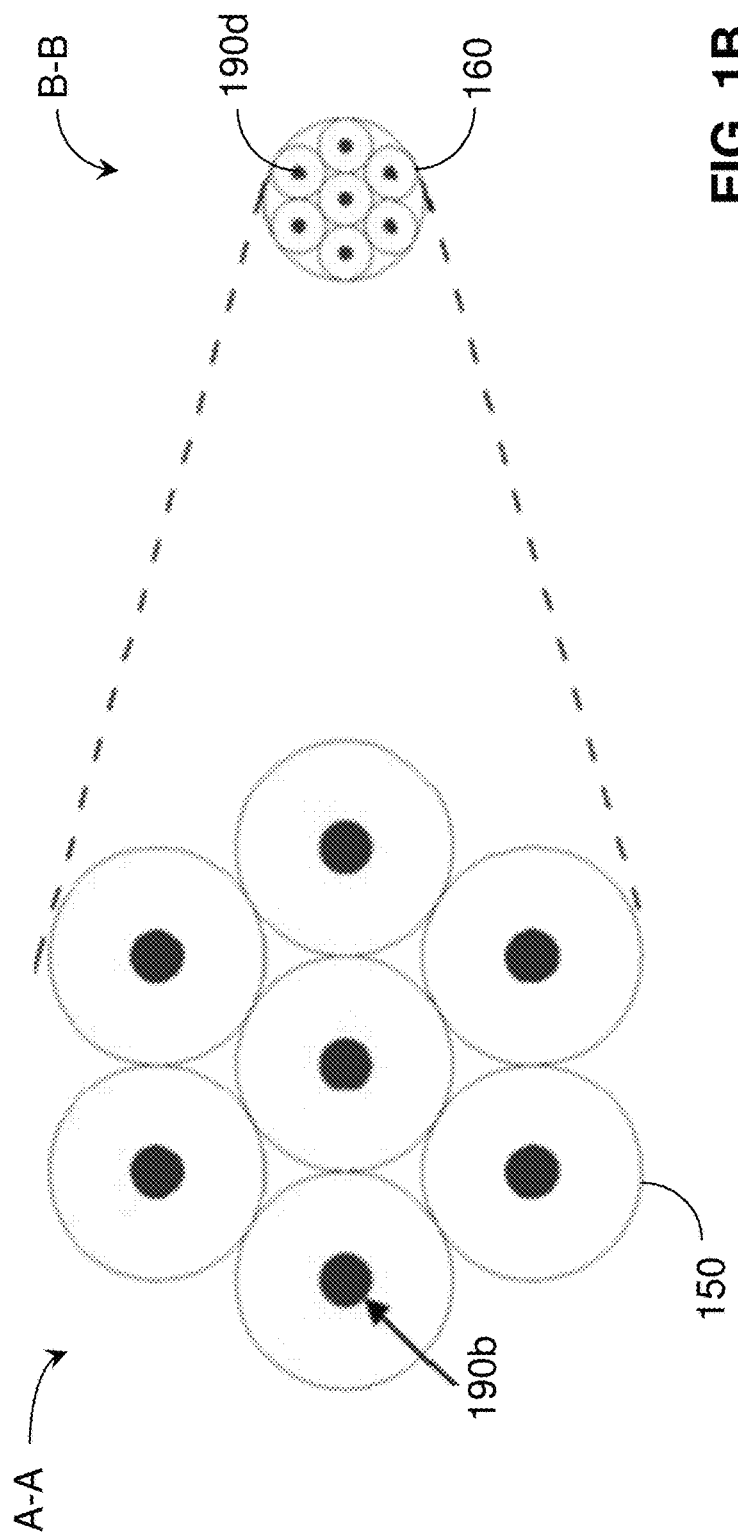

Conventionally, optical beams are combined using a form of tapered fiber combiner, such as that shown in FIGS. 1A and 1B (collectively, FIG. 1). Specifically, FIG. 1A shows three (3) distinct segments to a conventional combining system, namely, input array of optical fibers 110, a tapered fiber bundle 120, and an output delivery fiber 130. As shown in FIG. 1A, the input optical fibers 110 are typically single-mode (SM) optical fibers with a core 150 and a cladding 140 that surrounds the core 150. Similarly, the output delivery fiber 130 is typically a MM optical fiber with a core 170 and a cladding 180.

The input optical fibers 110 are optically coupled to input ends (before A-A) of the tapered fiber bundle 120, while the output delivery fiber 130 is optically coupled to an output 160 of the tapered fiber bundle 120 (after B-B). This permits the input optical fibers 110 to guide separate optical beams 190a to the fiber cores within the tapered fiber bundle 120, where the optical beams 190b, 190c, 190d are thereafter guided to the output delivery fiber 130, where the optical beam 190e, now a composite of the individual beams, continues to travel. The tapered fiber bundle 120 exhibits a down-tapering (between A-A and B-B), thereby resulting in a decrease in cross-section along the down-tapered region.

FIG. 1B shows a close-packed arrangement of seven (7) fibers. Although an outer diameter of each fiber cladding 150 may be approximately 125 micrometers (~125 µm), a bulk of the energy from the optical beams at each stage (190a, 190b, 190c, 190d) is carried in smaller mode areas, with a typical mode-field diameter (MFD) being between ~10 µm and 17 µm. Because the combined cross-sectional area of the close-packed fibers is much larger than the core 170 area of the delivery optical fiber 130, the combiner 120 is tapered (between A-A and B-B) so that its output 160 is matched to the size of the core 170 of the delivery optical fiber 130. At some point, if the tapered fiber bundle 120 is tapered too much, then the beams 190 (or modes) become un-guided and expand to interact with the edge of the glass, thereby leaking optical energy.

The taper (between A-A and B-B) in the tapered fiber bundle 120 normally results in a corresponding decrease in MFD, which can be minimized through special design of the tapered fiber bundle 120, as shown by the progression of the optical beam 190 in FIGS. 1A and 1B. In the absence of special design of the tapered fiber bundle 120, the decrease in MFDs (190b, 190c, 190d) correspond to an increase in beam divergence at the output 160 of the tapered fiber bundle 120. The increased beam divergence results in a proportional increase in BPP, which indicates a degradation in the quality of the optical beam 190.

Figure 2:
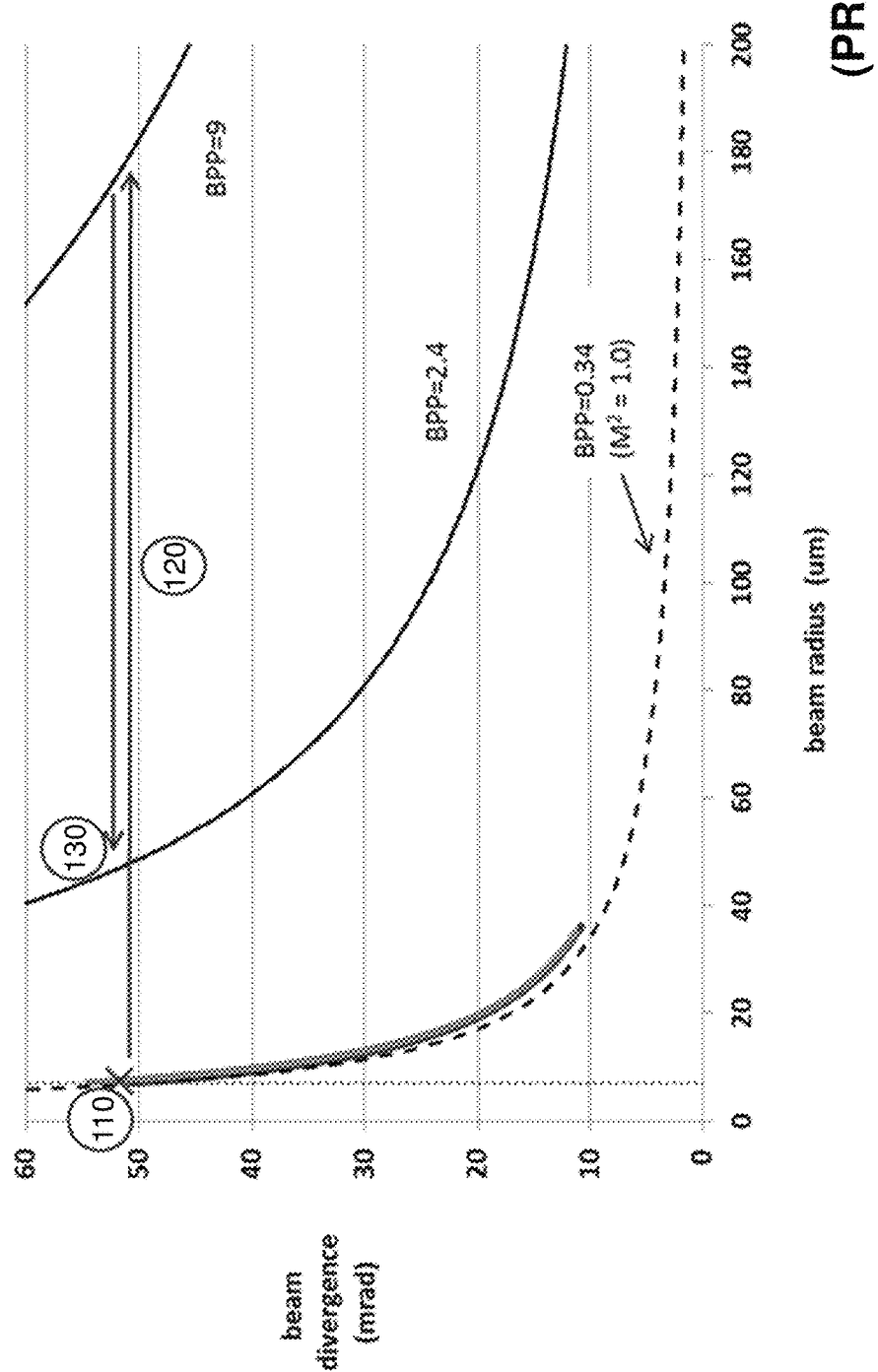
FIG. 2 is a graph showing behavior of a beam parameter product (BPP) for the conventional beam combiner of FIG. 1.

One example of the evolution of the BPP is shown graphically in FIG. 2. As shown in the example of FIG. 2, the effective BPP=~0.34 at the input optical fiber 110, but effectively jumps to as high as BPP=~9 in the tapered fiber bundle 120 (at A-A), and then recovers back to BPP=~2.4 by the time that the optical beam 190 reaches the output delivery fiber 130.

Because of problems associated with large divergence and increases in BPP (as large as ~9), conventional combiners often require special techniques and careful monitoring to determine the tradeoff between low divergence and leakage loss.

Figure 3:
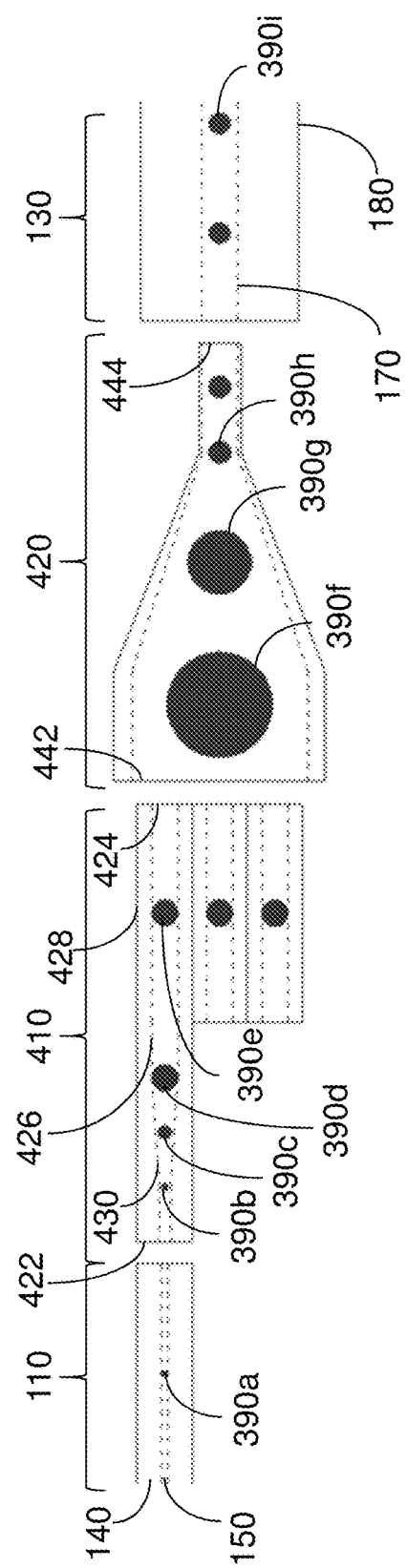
FIG. 3 is a diagram showing one embodiment of a fiber beam combiner utilizing mode adaptation.
Figure 4:
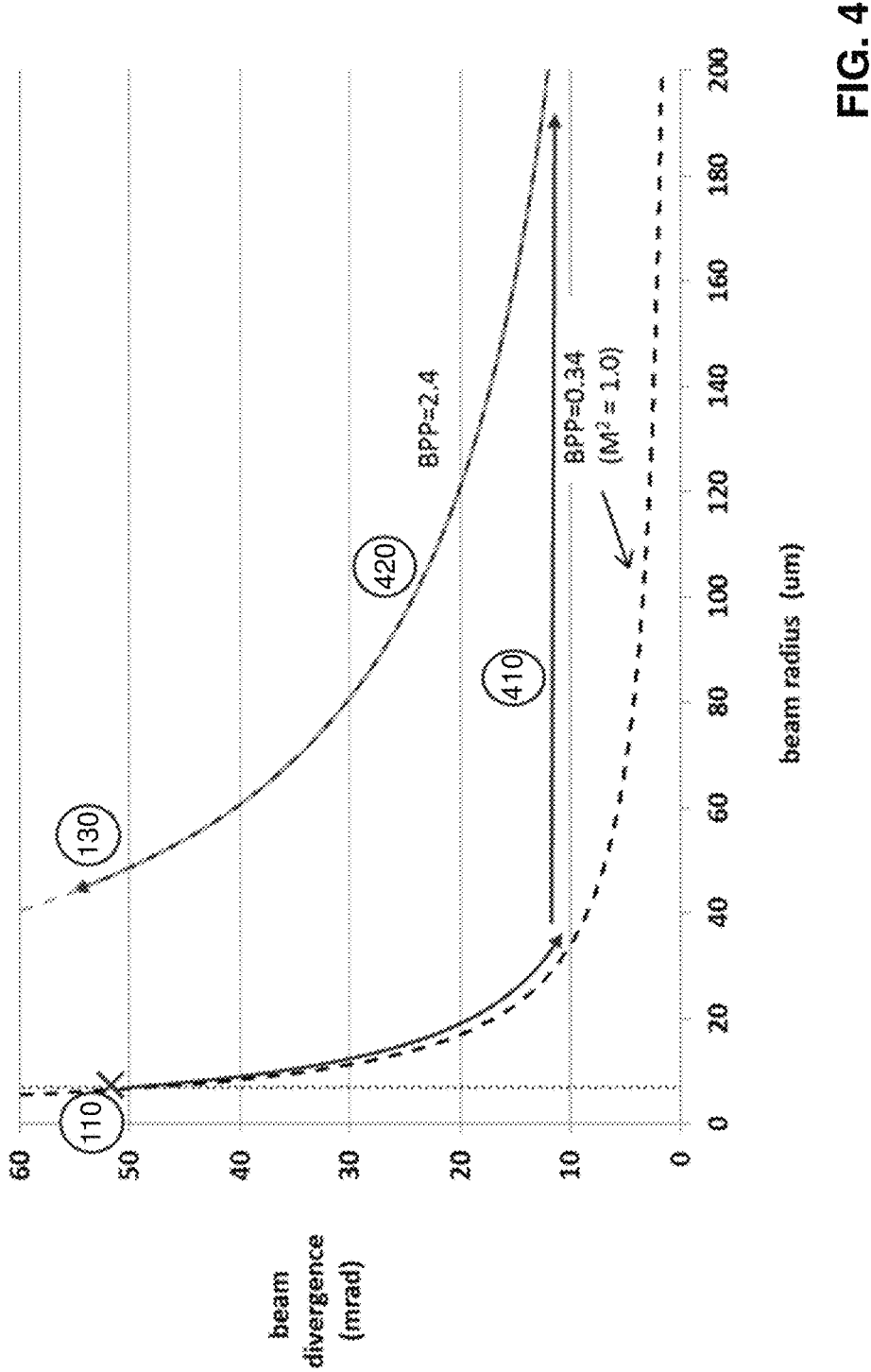
FIG. 4 is a graph showing behavior of BPP for the embodiment of the fiber combiner of FIG. 3.

Unlike conventional beam combiners, the present disclosure addresses the problems associated with high divergence and correspondingly high BPP by employing a mode expander (e.g., up-taper region, graded index lens, thermal diffusion, compression, etc.) to increase a signal mode area and decrease the cladding area prior to tapering and combining. This disclosure also avoids the need for a special design of the tapering fiber to minimize the change in MFD. This is discussed in greater detail with reference to FIGS. 3 and 4. Specifically, FIG. 3 is a diagram showing one embodiment of a fiber combiner utilizing mode adaptation, while FIG. 4 is a graph showing the BPP behavior in the combiner of FIG. 3. While several embodiments are described in connection with these drawings, there is no intent to limit the disclosure to the embodiment or embodiments disclosed herein. On the contrary, the intent is to cover all alternatives, modifications, and equivalents.

As shown in FIG. 3, one embodiment of the improved fiber combiner comprises input optical fibers 110 optically coupled to a mode adapter 410, which in turn is optically coupled to a taper 420, which is optically coupled to a delivery optical fiber 130. In particular, the embodiment of FIG. 3 shows an evolution of the MFD of the individual optical beams 390*a*, 390*b*, 390*c*, 390*d*, 390*e*, and 390*f* followed by the composite beam 390*g*, 390*h*, 390*i* as the optical beam(s) 390 travels from the input optical fiber 110, through the mode adapter 410 and the taper 420, and then through the delivery optical fiber 130.

Similar to FIG. 1, the input optical fiber 110 of FIG. 3 comprises a core 150 and a cladding 140, while the delivery optical fiber 130 also comprises a core 170 and a cladding 180. In other words, there is no difference between FIG. 3 and FIG. 1 for the input optical fibers 110 and the delivery optical fiber. Insofar as these fibers 110, 130 are known to those having skill in the art, and insofar as these components are discussed with reference to FIG. 1, further discussion of the input optical fibers 110 and the delivery optical fiber 130 is omitted here.

Unlike FIG. 1, however, the embodiment of FIG. 3 comprises mode adapters 410 and a taper 420 instead of a tapered fiber bundle 120 (FIG. 1A). As shown in FIG. 3, the mode adapter 410 comprises input ends 422 and output ends 424. The mode adapters 410 further comprise cores 426 and claddings 428, which extend between the input ends 422 and the output ends 424. Each core 426 comprise a mode expander (shown in this particular embodiment as an up-tapered region 430), with the output end 424 having a core diameter that is larger than a core diameter of the input end 422. It should be appreciated that the mode expanders can be realized through an up-taper or other means, such as a series of spliced sections. Continuing, because of this increase in diameter, the up-tapered regions 430 progressively increase each mode area (or MFD) of each optical beam 390*b*, 390*c*, 390*d*, 390*e* as the optical beams 390 travel through the up-tapered regions 430. These increased MFDs translate to a lower beam divergence, which in turn translates to a better BPP. It should be noted that, in order to guide the optical beams 390, the claddings 428 have an index of refraction that is less than an index of refraction of the cores 426.

For some embodiments, the mode adapter 410 comprises multi-mode (MM) optical fibers, which are more tolerant to uncertain launch conditions. Consequently, the use of MM optical fibers provides better delivery of higher optical powers, such as for optical beams that exceed 6 kW, and more preferably for optical beams that exceed 12 kW. In some embodiments, the MM cladding 428 has an outer diameter of between ~110 µm and ~125 µm at the output end 424, while the MM core 426 has a diameter of between ~50 µm and 100 µm at the output end 424, thereby resulting in a thin-clad MM fiber with a cladding-to-core ration of ~1.1. Typically, the MM optical fibers are arranged in a hexagonal close-packed arrangement.

At the input ends 422, the MFDs are matched in size with the single-mode (SM) optical fibers 110, thereby permitting efficient transmission of the optical beams 390*a* from the SM optical fibers 110 to the mode adapters 410 (showing optical beam 390*b*, 390*c*, 390*d*, 390*e*).

The taper 420 comprises an input end 442 and an output end 444. The input end 442 of the taper 420 is optically coupled to the output ends 424 of the mode adapters 410, thereby permitting efficient transmission of the optical beams 390*e* from the mode adapters 410 to the taper 420 (showing a common optical beam 390*f*).

Between the input end 442 and the output end 444, the taper 420 exhibits a down-taper, which decreases the cross-sectional area by a factor of between 3 and 12 (preferably, by a factor of ~3.75 for some embodiments). Correspondingly, the mode area (or MFD) of the optical beam 390*f*, 390*g*, 390*h* also decreases as the optical beam propagates through the taper 420. The decrease in MFD translates to an increase in beam divergence as the optical beam 390 travels through the taper 420. Depending on the power that is coupled to the combiner, the taper 420 is capable of delivering an output power that is greater than ~12 kW.

As shown in FIG. 4, the evolution of the optical beam 390 behaves differently from the optical beam 190 (FIGS. 1 and 2). Although the resulting BPP is similar when compared to FIG. 2, the process of arriving at the BPP is remarkably different and follows a different principle of operation as compared to the system of FIG. 1. Specifically, as shown in FIG. 4, the divergence of the optical beams 390 decrease (due to the increase in beam MFD), to exhibit BPP=~0.34. Unlike FIG. 2, where BPP jumps to ~9 in forming the bundle, the BPP in FIG. 4 converges to 2.4 for the array, due to the larger individual MFDs. The behavior of the optical beam 390 within the taper 420 similarly increases in divergence (due to the decrease in beam MFD).

As shown from the embodiments of FIGS. 3 and 4, providing a mode adapter 410 in conjunction with a taper 420 (preferably, glass) results in a remarkably different principle of operation that cannot be achieved by conventional tapered fiber combiners. Specifically, the mode adapters 410 comprise up-tapered regions 430, which increases signal (or beam) mode areas prior to tapering and combining, thereby providing comparable beam quality, as shown by the chart of the BPP in FIG. 4.

For clarity, one embodiment of the invention is a fiber combining system with mode adapters and a combiner. Each mode adapter comprises a core with a mode expander between the input and output of the core. The mode expander results in mode field diameter (MFD) being larger at the output of the core than it is at the input of the core. Each mode expander further comprises a cladding that surrounds the core, with the cladding having an index of refraction that is less than the index of refraction of the core. The combiner has an input end that is optically coupled to the adapter output end, and the combiner exhibits a down-tapering between its input end and its output end. Preferably, the down-tapering is by a factor of greater than three (3). The mode expander increases a mode area of an optical beam as the optical beam propagates through the mode expander, while the down-tapered region decreases the mode area of the optical beam as it propagates through the down-tapered region. For some embodiments, the mode adapter comprises a tapered multi-mode (MM) optical fiber. In preferred embodiments, the core has an output diameter of between approximately 50 micrometers (~50 μm) and ~100 μm, while the cladding has an outer diameter of between ~110 μm and ~125 μm. In example embodiments, the MFD of the input fiber matches the MFD of the MM optical fiber.

One embodiment of the invention comprises a mode adapter with a mode expander that progressively increases a mode area of an optical beam as the optical beam travels through the mode expander. This embodiment also comprises a combiner optically coupled to the mode adapter, with the combiner comprising a down-tapered region that progressively decreases the mode area of the optical beam as the optical beam travels through the down-tapered region. The mode adapter, in one embodiment, comprises multimode (MM) optical fibers arranged in a close-packed configuration, with each MM optical fiber having an output MFD that is larger than the input MFD. The mode adapter lowers beam divergence as the optical beam travels through the mode adapter.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A fiber combining system, comprising:
  (a) mode adapters, each mode adapter comprising:
    (a1) a core, comprising:
      (a1A) a core input end having an input fundamental mode field diameter (MFD); and
      (a1B) a core output end having an output fundamental MFD, the output fundamental MFD being larger than the input fundamental MFD;
      (a1C) a mode expander between the core input end and the core output end; and
      (a1D) a core index of refraction; and
    (a2) a cladding surrounding the core, the cladding comprising a cladding index of refraction, the cladding index of refraction being less than the core index of refraction; and
  (b) a combiner, comprising:
    (b1) a combiner input end optically coupled to the adapters' core output ends;
    (b2) a combiner output end; and
    (b3) a down-tapered region between the combiner input end and the combiner output end.

2. The system of claim 1, wherein the mode expander increases a mode area of an optical beam as the optical beam propagates through the mode expander.

3. The system of claim 1, wherein the down-tapered region decreases a mode area of an optical beam as the optical beam propagates through the down-tapered region.

4. The system of claim 1, wherein the mode adapter comprises a tapered multi-mode (MM) optical fiber.

5. The system of claim 4, wherein:
  the core output diameter is between approximately 50 micrometers (~50 μm) and ~100 μm; and
  the cladding has an outer diameter of between ~110 μm and ~125 μm.

6. The system of claim 4, wherein the MM optical fiber comprises the mode expander and the core input end, the core input being MM with a fundamental mode field diameter (MFD), the system further comprising:
  an input fiber for propagating a fundamental mode, the input fiber having an input fiber MFD that matches the MM fundamental mode MFD.

7. The system of claim 1, further comprising an input fiber optically coupled to the core input.

8. The system of claim 1, wherein the input fiber is configured to transmit a fundamental mode.

9. The system of claim 1, wherein the combiner input diameter is more than three (3) times larger than the combiner output diameter.

10. A system, comprising:
  a mode adapter comprising a mode expander that progressively increases a mode area of an optical beam as the optical beam travels through the mode expander, wherein the mode adapter comprises multi-mode (MM) optical fibers arranged in a close-packed configuration, wherein each MM optical fiber comprises a MM core, the MM core comprising:
    a MM input end having a MM input fundamental mode field diameter (MFD) and a MM core input numerical aperture (NA); and
    a MM output end having a MM output fundamental MFD, the MM output fundamental MFD being larger than the MM input MFD; and
  a combiner optically coupled to the mode adapter, the combiner comprising a down-tapered region that progressively decreases the mode area of the optical beam as the optical beam travels through the down-tapered region.

11. The system of claim 10, further comprising:
  an input single-mode (SM) optical fiber having a SM output end, the SM output end being optically coupled to the MM input end, the SM optical fiber having a SM output mode field diameter (MFD), the SM output MFD substantially matching the MM input fundamental MFD.

12. The system of claim 10, wherein the mode adapter is configured to lower beam divergence as the optical beam travels through the mode adapter.

13. The system of claim 10, wherein the down-tapered region is tapered by a factor greater than 3.

* * * * *